(12) United States Patent
Cecil et al.

(10) Patent No.: US 8,402,724 B2
(45) Date of Patent: Mar. 26, 2013

(54) METHOD AND APPARATUS FOR PRODUCT IN SEAL DEFLECTION

(75) Inventors: Michael Calvin Cecil, Mechanicsville, VA (US); Xuan Pham, Glen Allen, VA (US); George Van Bergen, Chester, VA (US)

(73) Assignee: Philip Morris USA Inc., Richmond, VA (US)

( * ) Notice: Subject to any disclaimer, the term of this patent is extended or adjusted under 35 U.S.C. 154(b) by 96 days.

(21) Appl. No.: 12/155,226

(22) Filed: May 30, 2008

(65) Prior Publication Data

US 2009/0113852 A1  May 7, 2009

Related U.S. Application Data

(60) Provisional application No. 60/924,795, filed on May 31, 2007.

(51) Int. Cl.
  *B65B 9/20* (2012.01)
  *B65B 51/30* (2006.01)
(52) U.S. Cl. .............. 53/451; 53/479; 53/552; 53/374.6
(58) Field of Classification Search .............. 53/451, 53/457, 167, 547, 548, 550, 551, 552, 567, 53/479, 374.3, 374.5, 374.6
  See application file for complete search history.

(56) References Cited

U.S. PATENT DOCUMENTS

| | | | | |
|---|---|---|---|---|
| 2,145,941 A | * | 2/1939 | Maxfield | 53/433 |
| 2,915,866 A | * | 12/1959 | Bartlo | 53/526 |
| 3,027,695 A | * | 4/1962 | Leasure | 53/451 |
| 3,070,931 A | * | 1/1963 | Zwight | 53/552 |
| 3,381,441 A | * | 5/1968 | Condo, Jr. et al. | 53/452 |
| 3,509,799 A | | 5/1970 | Weis et al. | |
| 3,525,193 A | * | 8/1970 | Cutler et al. | 53/437 |
| 4,079,662 A | * | 3/1978 | Puccetti et al. | 53/552 |
| 4,228,900 A | | 10/1980 | Lambach et al. | |
| 4,291,520 A | | 9/1981 | Prince et al. | |
| 4,391,081 A | * | 7/1983 | Kovacs | 53/436 |
| 4,563,862 A | * | 1/1986 | McElvy | 53/552 |

(Continued)

FOREIGN PATENT DOCUMENTS

| EP | 0276628 | 8/1988 |
|---|---|---|
| EP | 0982229 | 3/2000 |

(Continued)

OTHER PUBLICATIONS

International Search Report and Written Opinion Mailed Nov. 21, 2008 for PCT/IB2008/001841.

(Continued)

*Primary Examiner* — Stephen F Gerrity
(74) *Attorney, Agent, or Firm* — Buchanan Ingersoll & Rooney PC

(57) ABSTRACT

A device for deflecting a loose fill product from the seal zone of a bag and sealing the bag is provided. The device includes a product stopper. The product stopper is adjacent to the sealing element of a bagging machine. The product stopper includes a mount that mounts the product stopper to a bagging machine and a pinching element that pinches a bag proximal to a sealing zone before the bag is sealed by the sealing element at the sealing zone. In one embodiment, the pincher includes a spring loaded mechanism for pinching the bag proximal to the sealing zone. In another embodiment, the pincher includes an air assist mechanism for pinching the bag proximal to the sealing zone.

19 Claims, 8 Drawing Sheets

U.S. PATENT DOCUMENTS

| | | | |
|---|---|---|---|
| 4,630,429 A * | 12/1986 | Christine | 53/479 |
| 4,703,765 A | 11/1987 | Paules et al. | |
| 4,757,668 A * | 7/1988 | Klinkel et al. | 53/451 |
| 4,869,048 A * | 9/1989 | Boeckmann | 53/451 |
| 5,038,550 A * | 8/1991 | Wirsig et al. | 53/451 |
| 5,174,088 A | 12/1992 | Focke et al. | |
| 5,247,779 A * | 9/1993 | Wirsig et al. | 53/374.2 |
| 5,279,098 A * | 1/1994 | Fukuda | 53/451 |
| 5,326,416 A * | 7/1994 | Perrett | 156/251 |
| 5,622,033 A * | 4/1997 | Fukuda | 53/551 |
| 5,714,033 A * | 2/1998 | Hayashi et al. | 156/380.5 |
| 5,771,667 A | 6/1998 | McGregor et al. | |
| 5,937,614 A * | 8/1999 | Watkins et al. | 53/79 |
| 6,138,442 A * | 10/2000 | Howard et al. | 53/477 |
| 6,216,420 B1 * | 4/2001 | Mazzetto et al. | 53/373.7 |
| 6,237,308 B1 * | 5/2001 | Quintin et al. | 53/451 |
| 6,301,859 B1 * | 10/2001 | Nakamura et al. | 53/373.7 |
| 6,347,499 B1 | 2/2002 | McGregor et al. | |
| 6,550,226 B1 | 4/2003 | Gates et al. | |
| 6,631,605 B1 * | 10/2003 | Quintin et al. | 53/451 |
| 6,711,874 B1 * | 3/2004 | Nakagawa et al. | 53/64 |
| 6,729,109 B2 * | 5/2004 | Knoerzer et al. | 53/451 |
| 6,868,655 B2 | 3/2005 | Gates et al. | |
| 7,003,931 B2 | 2/2006 | Gates et al. | |
| 7,003,934 B1 * | 2/2006 | Yano | 53/552 |
| 7,213,384 B2 * | 5/2007 | Matheyka et al. | 53/374.6 |
| 2005/0022467 A1 | 2/2005 | Kujubu et al. | |
| 2006/0096250 A1 | 5/2006 | Thurgood et al. | |

FOREIGN PATENT DOCUMENTS

| | | |
|---|---|---|
| EP | 1637456 | 3/2006 |

OTHER PUBLICATIONS

International Preliminary Report on Patentability issued Dec. 1, 2009 for PCT/IB2008/001841.

* cited by examiner

METHOD AND APPARATUS FOR PRODUCT IN SEAL DEFLECTION

CROSS REFERENCE TO RELATED APPLICATION

This application claims priority under 35 U.S.C. §119(e) to U.S. provisional Application No. 60/924,795, filed on May 31, 2007, the entire content of which is incorporated herein by reference.

BACKGROUND

During filling and sealing of bags on high speed, repetitive motion bagging machines, loose products are inserted into a tubing that is sealed at one end to form the bottom of a bag. Once the tube is filled, the top of the bag must also be sealed.

It is common for the loose product being inserted into the bags to migrate into the sealing zone, thereby interfering with the sealing element as the top seal is formed. As a result, the product may be lodged in the seal, causing a shorter shelf-life or loss of freshness. Additionally, bags with incomplete seals are not tamper proof.

Generally, bags with incomplete seals are not acceptable for shipping to stores. Therefore, there is a loss of time and money for bags that are improperly sealed.

Thus there remains a need in the art for a device for a repetitive motion bagging machine that deflects a product away from the sealing zone of a bag prior to sealing.

SUMMARY

Provided is a device for a repetitive motion bagging machine that deflects a product from the seal zone of a bag prior to sealing the bag.

In a preferred embodiment, the device includes a product stopper for pinching the bag just below the sealing zone prior to sealing the bag. Preferably, the product stopper is located adjacent to a sealing element of a bagging machine.

In a preferred embodiment, the product stopper includes a spring loaded mechanism that is capable of pinching the bag. Preferably, the product stopper is set to pinch the bag prior to sealing and release the bag after the bag is sealed.

In another embodiment, the product stopper includes an air assist mechanism that pinches the bag.

In an embodiment, the product stopper may be mounted on the sealing element of a bagging machine. Preferably, the product stopper may include two opposing parts, each spring loaded or air assisted, that come together to pinch the bag when activated. Likewise, the sealing element, in an embodiment, also includes two opposing parts that converge on the sealing zone of the bag to form a seal. Preferably, one portion of a product stopper may be attached to each portion of the sealing element.

Preferably, the sealing element is a heat sealing element that heat seals the sealing zone of a bag after the product stopper has pinched the bag to prevent a product from entering the sealing zone.

In an embodiment, the sealing element is capable of forming a top seal of a first bag and a bottom seal of a second bag simultaneously, while the product stopper prevents the enclosed product from interfering with the seals.

DETAILED DESCRIPTION

Figure 1:
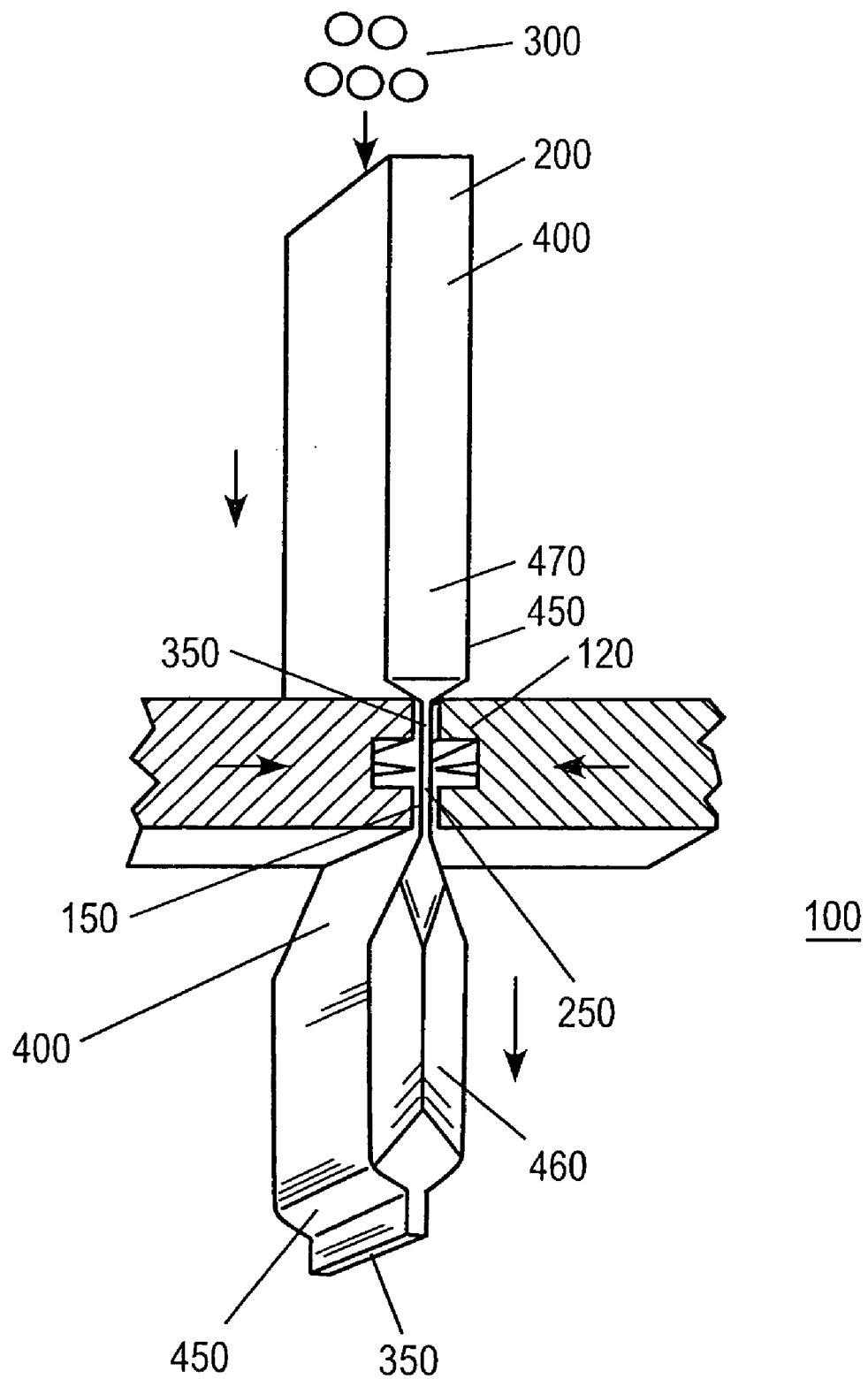
FIG. 1 is a perspective view of an apparatus for filling and sealing bags, not including a product stopper.

As seen in FIG. 1, a repetitive feed vertical fill bagging machine 100 includes a sealing element 120 that seals a tube 200 at select locations to form at least a first bag 460 and a second bag 470. At set points along the tube 200, seals 250, 350 are formed at the sealing zone 150 by the sealing element 120 to form the bags 460, 470 as the tube 200 runs through the machine. Preferably, the bags are formed repetitively as the tube 200 runs through the machine.

In an embodiment, a bagging machine includes multiple sets of sealing elements 120 for sealing the tube at set locations. Alternatively, the bagging machine includes a single set of sealing elements 120.

In a preferred embodiment, the tube that forms the bags is made of plastic. In other embodiments, the bag is made of paper or metal. In an embodiment, the bag is made of a permeable material. In another embodiment, the bag is made of an impermeable material.

The sealing element 120 seals the tube 200 at a sealing zone 150 at select points along the tube 200 to form a top seal 250 at the top 400 of a first bag 460 and a bottom seal 350 at the bottom 450 of a second bag 470.

In an embodiment, the sealing element 120 forms the top seal 250 for the first bag 460 and the bottom seal 350 for the second bag 470 simultaneously. The two simultaneously formed seals 250, 350 are preferably formed by a sealing element 120 that has at least two sealing surfaces.

Preferably, the sealing element 120 is a heat sealer so that when the two layers of the bag are pressed together and heat is applied, a seal is formed. In an embodiment, the sealing element 120 is heated by a resistance heater. In another embodiment, the sealing element 120 is heated by convection.

Once the bottom seal 350 of the second bag 470 is in place, a loose product 300 is dropped into the tube 200 to fill the second bag 470. The bagging machine includes a hopper that holds the loose product 300. In an embodiment, a nozzle descends from the hopper to just above the open tube 200. Preferably, the bagging machine is programmed to insert a fixed amount of the loose product 300 into the tube 200. However, nothing prevents the loose product 300 from entering the upper sealing zone 150 of the bag 460 prior to sealing the upper end of the bag.

Thus, the product 300 may interfere with the sealing element 120 by entering the sealing zone 150 causing the bag to be only partially sealed.

As such the freshness of the product 300 may be compromised. In addition, such bags may appear as if they have been tampered with and thus cannot be sold.

Figure 2:
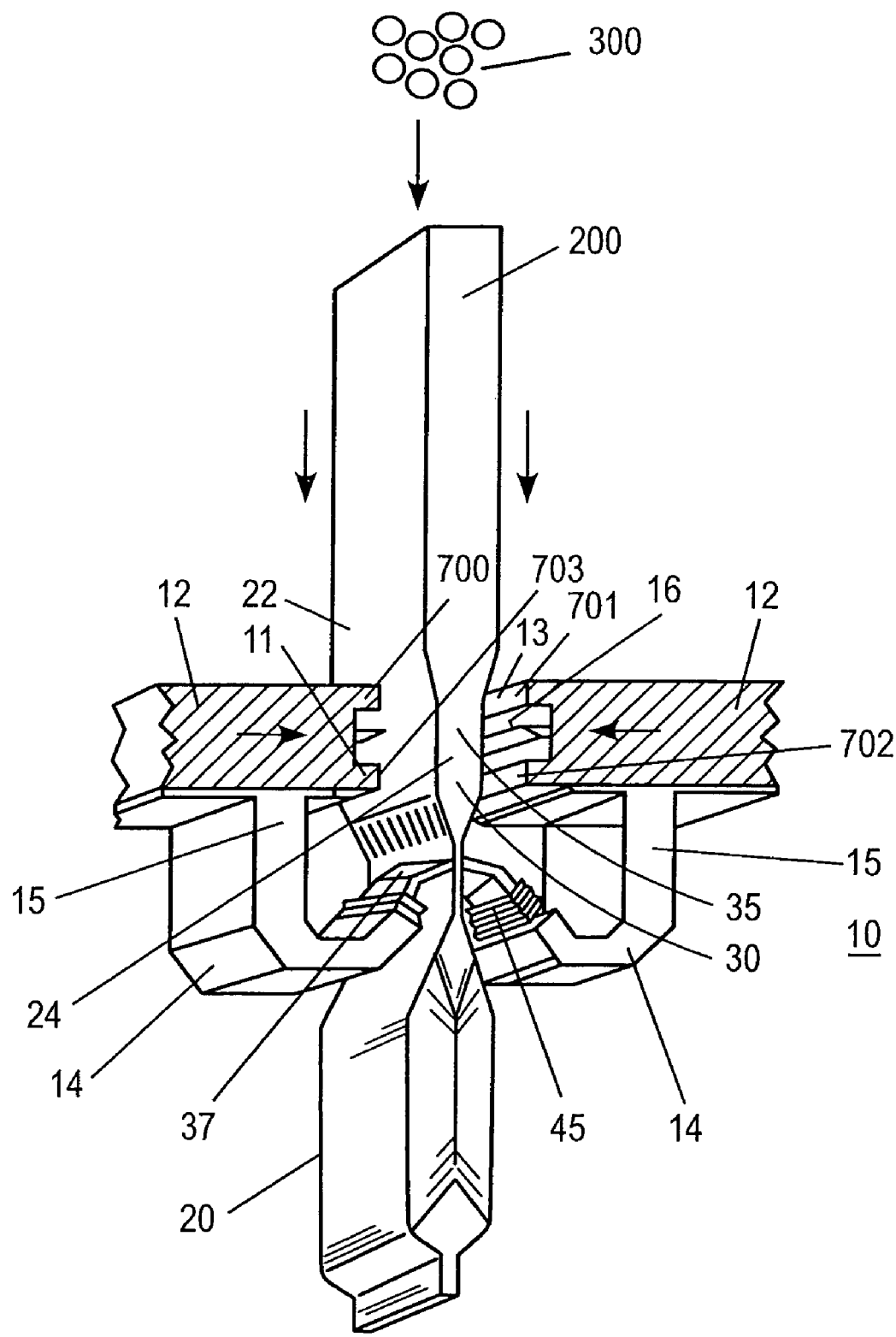
FIG. 2 is a perspective view of an apparatus for filling and sealing bags including a product stopper having a spring loaded mechanism.

As described herein and shown in FIG. 2, a device for preventing loose product from interfering with a seal is provided.

In a preferred embodiment, the device 10 may be retrofitted onto a traditional sealing element of a continuous feed, vertical fill bagging machine, such as the sealing element 120 shown in FIG. 1.

Preferably, as seen in FIG. 2, the device 10 includes a product stopper 14 that is adjacent to a sealing element 12 of a bagging machine.

In an embodiment, the product stopper 14 is made of plastic. In another embodiment, the product stopper 14 is made of metal.

In an embodiment, the product stopper 14 includes a mount 15 and a pinching element 37. Preferably, the mount 15 supports the pinching element 37 that pinches the tube 200 prior to sealing the bag.

In one embodiment, the product stopper 14 is mounted onto a sealing element 12 of a continuous feed bagging machine by the mount 15. In an embodiment, the mount 15 of the product stopper 14 is bolted to the sealing element 12. In another embodiment, the mount 15 of the product stopper 14 is welded onto the sealing element 12.

In a preferred embodiment, the product 300 is a tobacco product. Preferably, the tobacco product is in its final form and ready to be packaged and shipped to consumers. Such tobacco products include chewing tobacco or a pouched tobacco product. Preferably, the chewing tobacco or pouched tobacco products are inserted in the tube 200 for packaging in a set quantity. Preferably, the bagging machine has a hopper with a nozzle that ejects the set quantity of product into the tube 200.

In another embodiment, the bagging machine with the product stopper 14 is used to make consumable pouch products such as a snus. Preferably, a permeable pouch material forms the tube 200, which in turn forms small bags when sealed at select locations. A loose tobacco material is portioned and inserted into the tube above a bottom seal. A top seal is then formed in the tube to form a pouched tobacco product. The pouched tobacco product is sized for oral consumption and has dimensions of less than about 2 inches.

In another embodiment, the bagging machine with a product stopper 14 is used to form a pouched, non-tobacco product. The oral, non-tobacco product has dimensions of less than about 2 inches.

The bagging machine with a product stopper 14 is then used to place multiple pouched products in a larger bag for sealing.

Preferably, the pinching element 37 of the product stopper 14 is sized so that it can span the width of most tubes 200 that form the bags so that bags of varying sizes may be formed and sealed using the product stopper 14. Preferably, the pinching element 37 is designed to pinch the span of the tube so that no holes are left open through which the product may travel into the sealing zone 24 of a tube 200. In another embodiment, the pinching element 37 is designed to pinch only a portion of the span of the tube so that air can be released prior to sealing. The pinching elements 37 are sized to allow air to release, but prevents product that may be initially entrained with the air from moving up and into the area to be sealed.

In an embodiment, the pinching element 37 pinches the tube 200 at select locations along the span to prevent the loose product 300 from traveling into the seal zone 24.

In one embodiment, the product stopper 14 includes a spring loaded mechanism 45 that pinches the first bag 20 just below the sealing zone 24 prior to sealing by the sealing element 12. Preferably, the product stopper includes two opposing parts, each spring loaded, that converge on an area proximal to the sealing zone 24 and pinch the substantial span of the tube 200 when activated. In an embodiment, the two opposing, spring-loaded parts are pinching elements 37. Preferably, each opposing, spring-loaded pinching element 37 is mounted onto the bagging machine by a mount 15.

Figure 3:
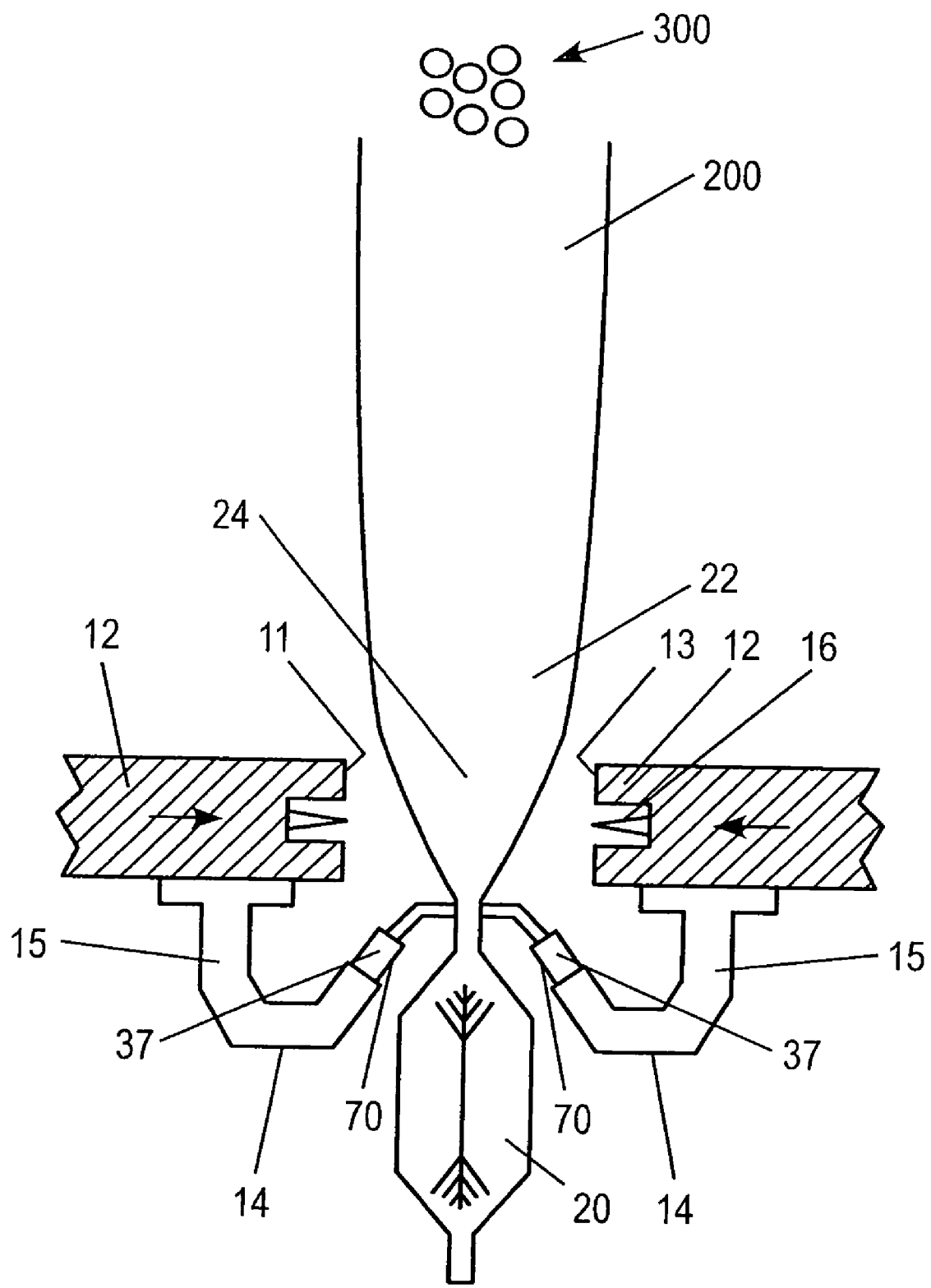
FIG. 3 is a front view of an apparatus for filling and sealing bags including a product stopper having an air assist mechanism.

In another embodiment, the product stopper 14 includes a pinching element 37 with an air assist mechanism 70, as seen in FIG. 3. Preferably, the product stopper 14 includes two opposing parts, each having an air assist mechanism that converges on the tube 200. In a preferred embodiment, the two opposing parts are pinching elements 37 that pinch that tube 200.

In an embodiment, the product stopper 14 is programmed to converge on the sealing zone 24 at set times or at set lengths along the tube 200.

In an embodiment, the sealing element 12 also includes two opposing parts that converge on the sealing zone 24 of the bag to form a seal. Preferably, one portion of a product stopper 14 may be attached to each portion of the sealing element 12 by the mount 15.

In an embodiment, the sealing element 12 also includes a cutting edge 16 that separates a bag after the open end of the bag is sealed. As the tube 200 advances, seals are formed at the top of the lower bag and bottom of an upper bag. Once the top seal is formed by the sealing element 12, the cutting edge 16 penetrates the tube 200 to separate the newly sealed bag from the remaining tube 200.

Preferably, the sealing element 12 is a heat sealing element with opposing sides 11, 13 that converge on a sealing zone 24 between a first bag 20 and a second bag 22.

In a preferred embodiment, the sealing element 12 forms the top seal 30 of the first bag 20 and the bottom seal 35 of the second bag 22 simultaneously.

In a preferred embodiment, the sealing element 12 includes two opposing sides 11, 13 each having two heating surfaces 700, 701, 702, and 703 on each of the opposing sides 11, 13 so that when the sealing element 12 closes on the sealing zone 24, the tube 200 is sealed at two points, creating the top seal 30 of the first bag 20 and the bottom seal 35 of the second bag 22.

In another embodiment, the sealing element 12 glues opposing sides of the bag together to form a seal. In another embodiment, the opposing sides of the bag are stapled together to form a seal. In yet another embodiment, the opposing sides of the bag are tucked and folded together to seal the bag.

Preferably, a cutting edge 16 lies between each heating surface 700, 703 on one of the opposing sides 11, and between each heating surface 701, 702 on the second opposing side 13. The cutting edge 16, located between the top seal 30 and the bottom seal 35, separates the first bag 20 from the second bag 22 as the bottom seal 35 of the second bag 22 and the top seal 30 of the first bag 20 are formed. Once the cut is made, the first bag 20 is then ready for packaging, while the second bag awaits filling and a top seal.

As the tube 200 advances through the machine, the second bag 22 takes the place of the first bag 20 to make room for the formation of additional bags.

As shown in FIG. 2, when the continuous feed vertical fill bagging machine is equipped with two or more sealing elements 12, a product stopper 14 is located adjacent to or mounted onto each sealing element 12.

Figure 4A:
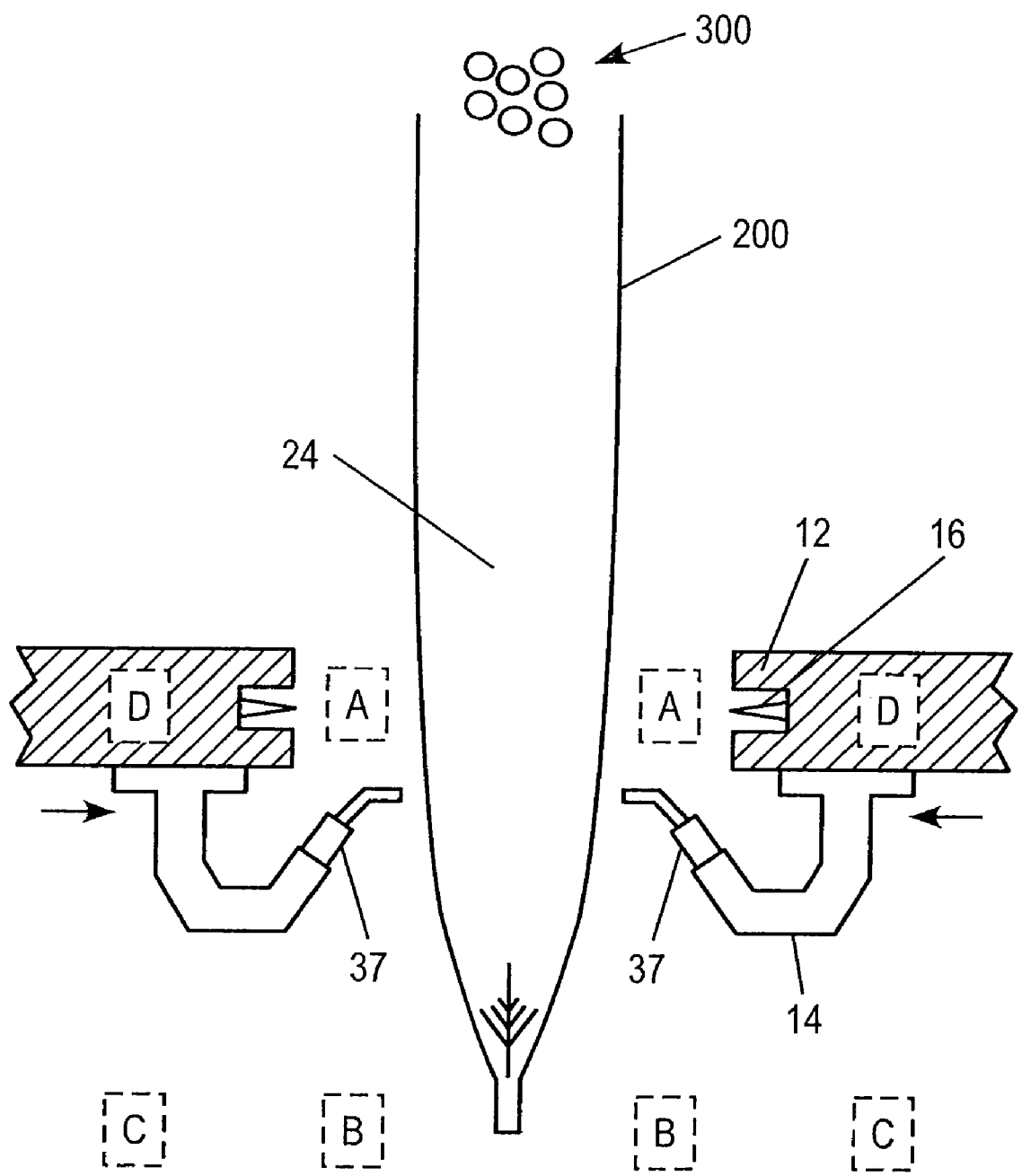
FIGS. 4A, 4B, 4C and 4D are front views of an apparatus for filling and sealing bags including a product stopper.

Referring to FIG. 4A, as the sealing elements 12 are moved from their upper, retracted positions "D" to their upper, closed position "A", a new bag is closed and sealing action is initiated. While closed, the sealing elements 12 begin moving downwardly from their upper, closed position "A" to their lower, closed positions "B" drawing additional column of tubular bag material 200 with them. At the lower closed positions "B", the bottom seal is fully formed and the knives 16 are actuated (closed) to sever away a newly formed bag. Thereafter, the sealing elements 12 retract from their lower, close positions "B" to their lower retracted positions "C". From there, they return to their upper, retracted positions "D". While the sealing elements 12 move into, through or beyond their lower, retracted positions "C", a predetermined amount of the product 300 is fed into the tube 200. Preferably, the predetermined amount of the product 300 is fed into the tube 200 as the sealing elements 12 move from their lower, retracted positions "C" to their upper, retracted positions "D".

Figure 4B:
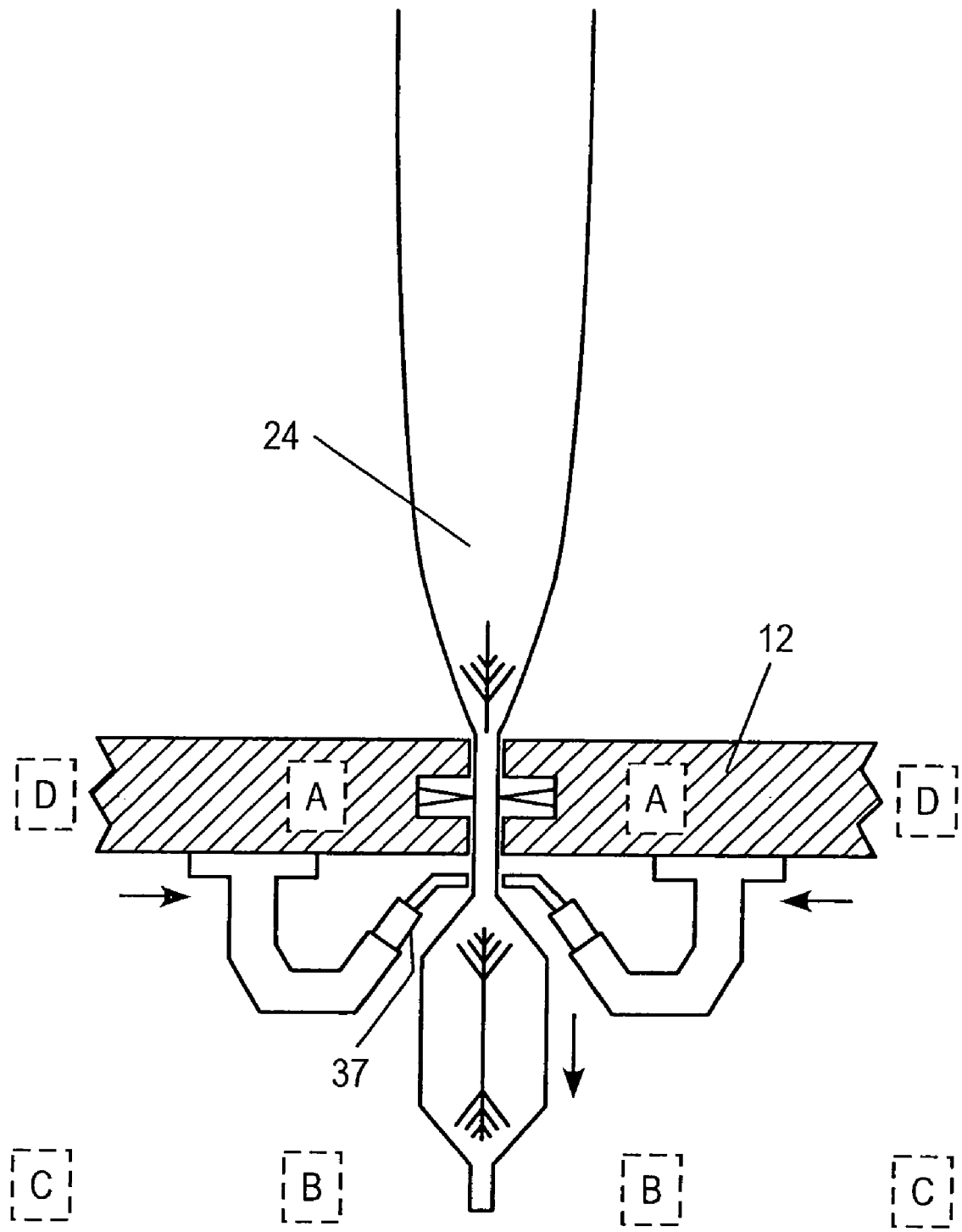
Figure 4C:
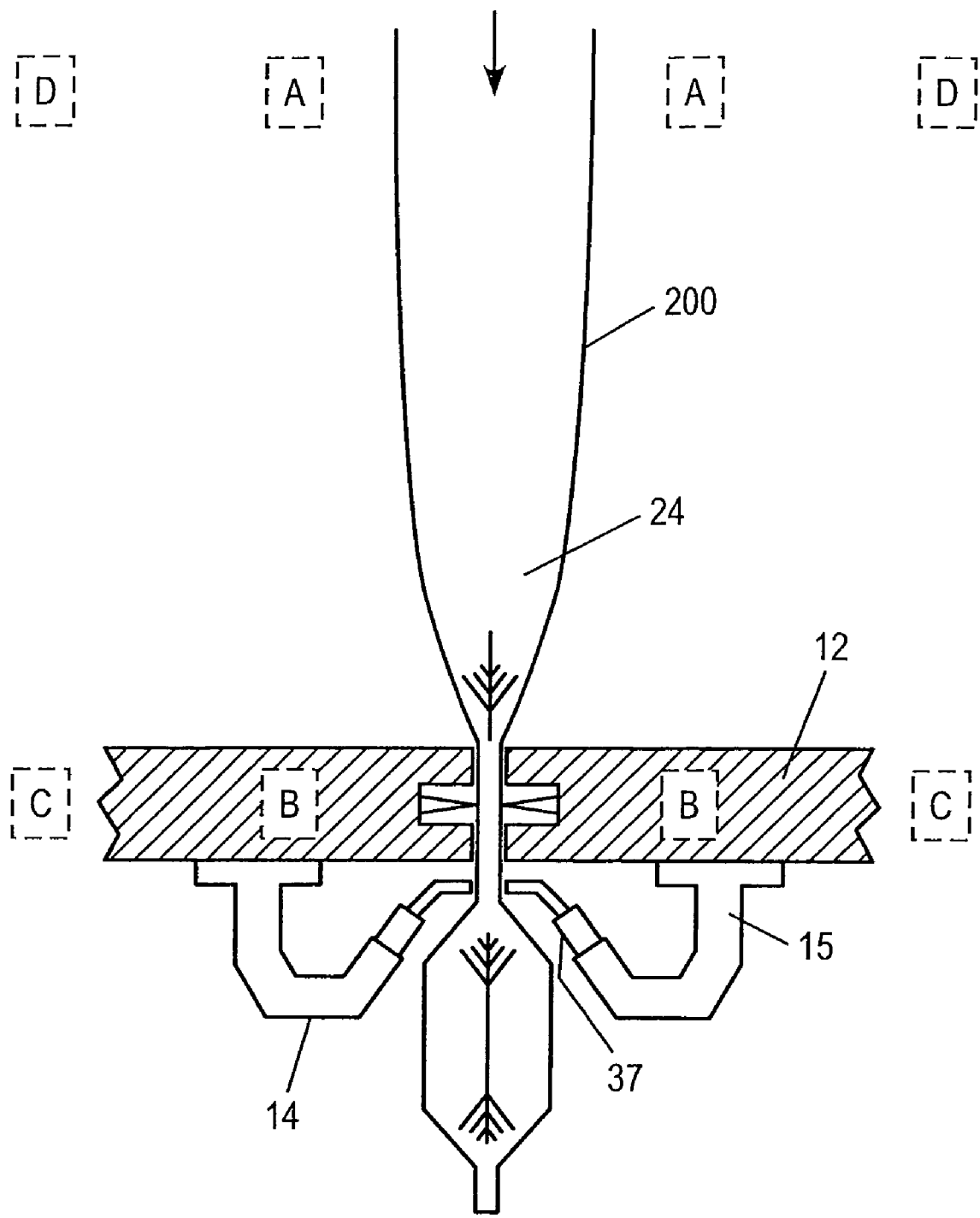
Figure 4D:
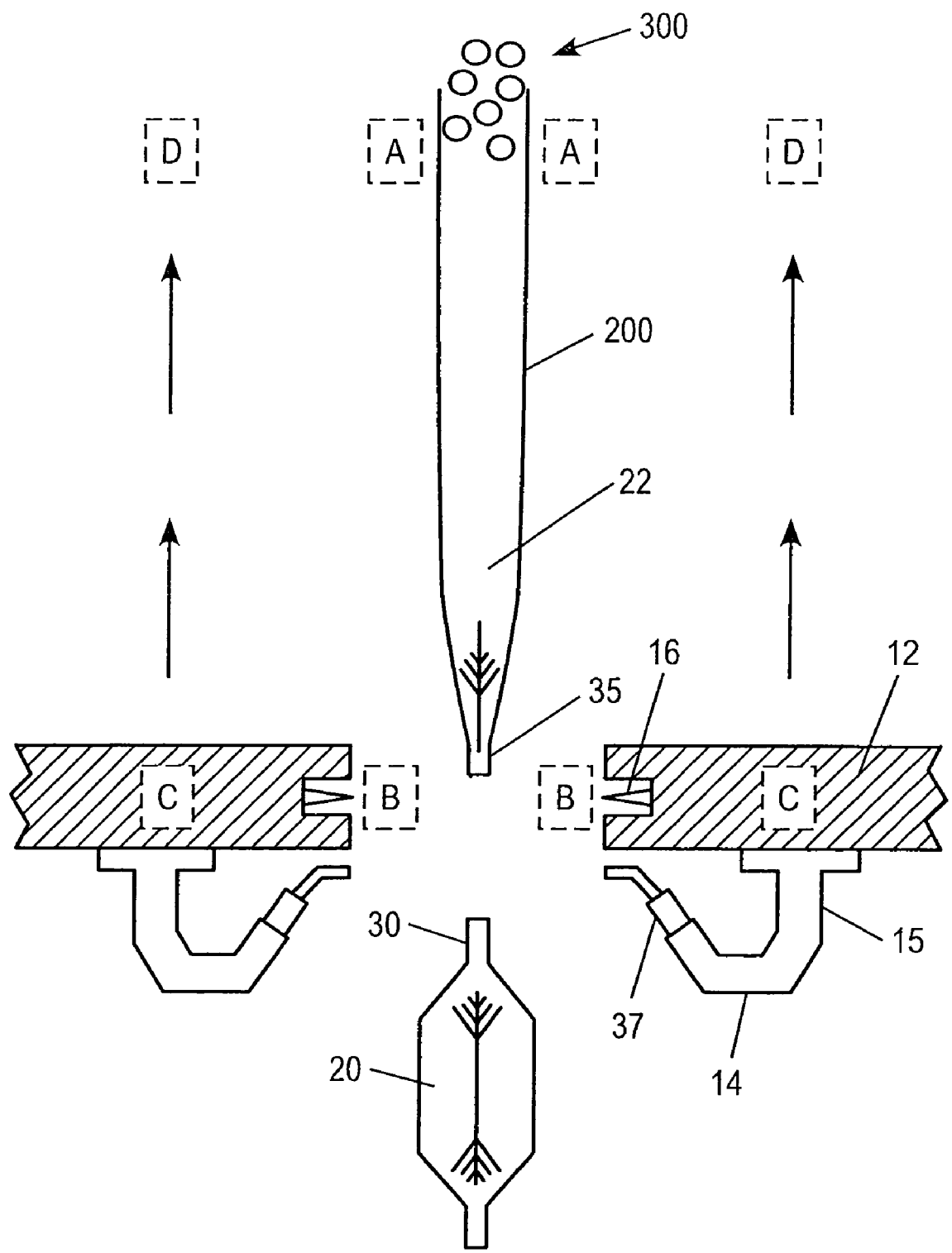

As shown in FIG. 4B, just before the sealing elements 12 fully arrive at their position "A," the pinching elements 37 close and pinch the bag at a location adjacent the sealing zone 24 just before the sealing elements 12 close on the tube 200 at the sealing zone 24. The sealing element 12 also moves downwardly with the tube to position "B" as shown in FIG. 4C. Once in position "B," the cutting element 16 severs the tube 200 at the sealing zone 24 between the top seal 30 of the first bag 20 and the bottom seal 35 of the second bag 22. The sealing elements 12 then retract to position "C" as shown in FIG. 4D, releasing the tube, and allowing the first bag 20 to detach from the machine.

Once the first bag 20 has been severed and detached, the sealing element 12 moves upwardly to position "D." While the sealing element moves to and/or is in position "D," product 300 has been or is placed in the tube.

Figure 5:
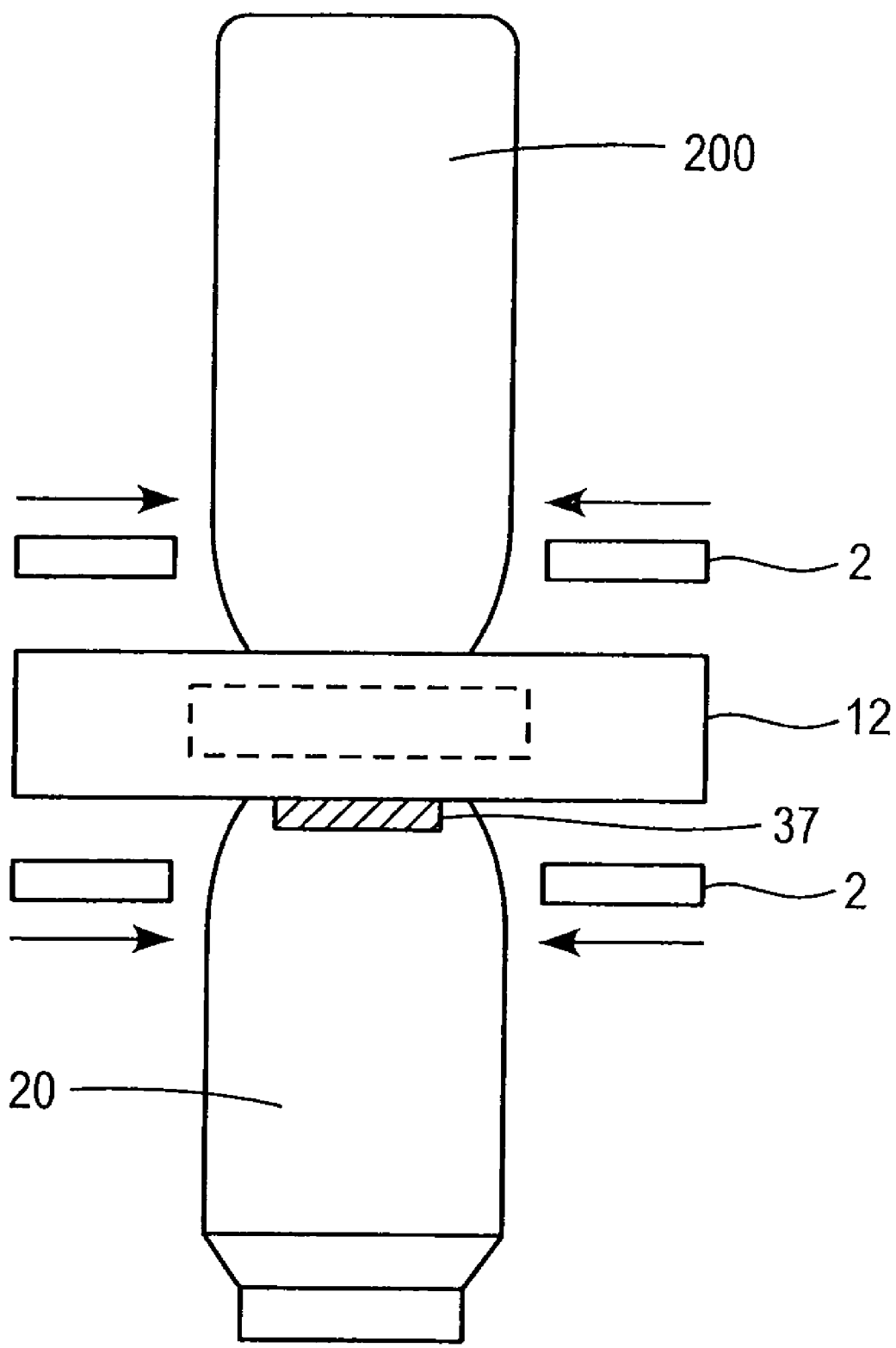
FIG. 5 is a side view of an apparatus for filling and sealing bags including a product stopper.

As shown in FIG. 5, in an embodiment, the bagging machine includes pins 2, which indent the sides of the tube to form opposed creases prior to the formation of the top seal. The action of the pins 2 reduces the volume of the bag, which tend to force the product 300 up into the sealing zone 24. In a preferred embodiment, the stopper 14 is activated prior to the pins to prevent the product 300 from entering the sealing zone 24 just before sealing. In other embodiments, the stopper 14 may be activated after the pins have indented the sides of the tube.

While the foregoing has been described in detail with reference to specific embodiments thereof, it will be apparent to one skilled in the art that various changes and modifications may be made, and equivalents thereof employed, without departing from the scope of the claims.

We claim:

1. A device for deflecting loose fill product from a seal zone of a bag comprising:
    a vertically movable sealing element operable to draw down a column of tubular bag material when in a closed position; and
    a product stopper adjacent to the sealing element of a vertical fill bagging machine,
    wherein said product stopper pinches a first bag proximal to a sealing zone prior to said first bag being sealed by said sealing element at said sealing zone to prevent the loose fill product from migrating into said sealing zone, and
    wherein said product stopper includes a mount and at least two opposing members, each of said opposing members of said product stopper includes a pinching element having a continuous straight edge and a spring loaded mechanism adapted to pinch said first bag proximal to said sealing zone, and wherein each of said pinching elements has a width which spans and pinches less than a full width of said first bag so that air can be released prior to sealing.

2. The device of claim 1, wherein said sealing element includes a cutting edge proximal to said sealing element operable to separate said first bag from a second bag.

3. The device of claim 1, wherein the sealing element is a heat sealing element.

4. The device of claim 1, wherein said product stopper is retrofitted onto an existing sealing element.

5. The device of claim 1, wherein said sealing element is configured to form a bottom seal of a first bag and a top seal of a second bag simultaneously.

6. The device of claim 1, wherein said product stopper is made from a material selected from the group consisting of metal, plastic, wood, and combinations thereof.

7. The device of claim 1, wherein the loose fill product is a pouched tobacco product.

8. The device of claim 7, wherein said pouched tobacco product is sized for oral consumption and has dimensions of less than about two inches.

9. The device of claim 1, wherein said bag is made of a material selected from the group consisting of plastic, paper, metal, and combinations thereof.

10. The device of claim 1, wherein each of said pinching elements pinches said tubular bag material at select locations along said width of said first bag to prevent loose product from traveling into said seal zone.

11. The device of claim 1, wherein each of the pinching elements has a continuous straight edge.

12. A method of sealing a bag to prevent a product from entering a seal zone of said bag prior to sealing comprising:
    forming a tube;
    forming a bag along said tube;
    filling the bag with a loose fill product;
    pinching the tube at a location proximal to a sealing zone with a product stopper attached to a pair of vertically movable sealing elements located in a first location, the product stopper including a pair of pinching elements each having a continuous straight edge and a spring loaded mechanism, and wherein each of said pinching elements has a width which spans and pinches less than a full width of said tube so that air can be released prior to sealing;
    closing the sealing elements around the tube to form a sealed bag; and
    moving the sealing elements downwardly to a second location so as to draw down additional tube material.

13. The method of claim 12, wherein seals are simultaneously formed at a top of a downstream bag and a bottom of an upstream bag along the tube.

14. The method of claim 12, further including cutting said tube between seals to separate the tube into filled bags.

15. The method of claim 12, wherein the sealing is accomplished by a method selected from the group consisting of heat sealing, tucking and folding, gluing, stapling, and combinations thereof.

16. The method of claim 12, wherein said loose fill product is loose tobacco material and the sealed bag is a pouched tobacco product sized for oral consumption.

17. The method of claim 12, further including indenting sides of the tube to form opposed creases with an operation of pins, such that the product stopper prevents the pin operation from causing the loose fill product from entering said sealing zone.

18. The method of claim 12, wherein each of said pinching elements pinches said tube at select locations along said width of said first bag to prevent loose product from traveling into said seal zone.

19. A device for deflecting loose fill product from a seal zone of a bag comprising:

a vertically movable sealing element operable to draw down a column of tubular bag material when in a closed position; and a product stopper adjacent to the sealing element of a vertical fill bagging machine, wherein said product stopper pinches a first bag proximal to a sealing zone prior to said first bag being sealed by said sealing element at said sealing zone to prevent the loose fill product from migrating into said sealing zone, wherein said product stopper includes a mount and at least two opposing members, each of said opposing members of said product stopper includes a pinching element having a continuous straight edge and a spring loaded mechanism adapted to pinch said first bag proximal to said sealing zone, and wherein each of said pinching elements has a width which spans and pinches less than a full width of said first bag so that air can be released prior to sealing; and further includes pins operable to indent sides of the first bag to form opposed creases after the product stopper pinches the first bag to prevent the pin operation from causing the loose fill product from entering the sealing zone.

* * * * *